US010262349B1

(12) United States Patent
Scott (10) Patent No.: US 10,262,349 B1
(45) Date of Patent: *Apr. 16, 2019

(54) LOCATION BASED CALL ROUTING TO SUBJECT MATTER SPECIALIST

(71) Applicant: Amazon Technologies, Inc., Reno, NV (US)

(72) Inventor: Sean Michael Scott, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 607 days.

This patent is subject to a terminal disclaimer.

(21) Appl. No.: 13/933,049

(22) Filed: Jul. 1, 2013

Related U.S. Application Data

(63) Continuation of application No. 13/208,589, filed on Aug. 12, 2011, now Pat. No. 8,478,278.

(51) Int. Cl.
*G06Q 30/06* (2012.01)

(52) U.S. Cl.
CPC .................. *G06Q 30/0613* (2013.01)

(58) Field of Classification Search
CPC ............ H04M 3/42348; G06Q 30/0613
USPC ............ 705/26.41, 26.1; 379/45, 356, 266
See application file for complete search history.

(56) References Cited

U.S. PATENT DOCUMENTS

| 6,324,274 | B1 * | 11/2001 | Akester ............... H04Q 3/0029 |
| | | | 379/201.02 |
| 6,981,020 | B2 | 12/2005 | Miloslavsky et al. |
| 7,272,223 | B2 | 9/2007 | McCormack et al. |
| 7,819,315 | B1 | 10/2010 | Pienkos |
| 8,787,540 | B1 | 7/2014 | Scott |
| 9,106,747 | B1 | 8/2015 | Scott |
| 2002/0002504 | A1 | 1/2002 | Engel et al. |
| 2003/0086539 | A1 * | 5/2003 | McCalmont et al. .......... 379/45 |
| 2005/0195960 | A1 * | 9/2005 | Shaffer ............... H04M 3/5232 |
| | | | 379/265.02 |
| 2006/0083225 | A1 * | 4/2006 | Tran ............................ 370/356 |
| 2007/0067317 | A1 | 3/2007 | Stevenson |
| 2007/0282564 | A1 | 12/2007 | Sprague et al. |
| 2007/0294354 | A1 | 12/2007 | Sylvain |
| 2008/0270249 | A1 * | 10/2008 | Rosenbaum et al. ........... 705/26 |
| 2008/0279353 | A1 | 11/2008 | Schambach |
| 2009/0157472 | A1 | 6/2009 | Burazin et al. |
| 2010/0094878 | A1 | 4/2010 | Soroca et al. |
| 2010/0322407 | A1 * | 12/2010 | Erhart et al. ............. 379/266.01 |

(Continued)

OTHER PUBLICATIONS

U.S. Appl. No. 13/217,369, filed Aug. 25, 2011, Response to Non-Final Office Action datedn Jan. 20, 2017.

(Continued)

*Primary Examiner* — Shahriar Behnamian
(74) *Attorney, Agent, or Firm* — Thomas | Horstemeyer, LLP (57) ABSTRACT

Disclosed are various embodiments for location based call routing to a subject matter specialist. A call request is obtained from a computing device. The call request pertains to a topic and includes a current location of the computing device. A topic specialist for the topic is identified based at least in part upon the current location of the computing device. The call request is completed by establishing a call between the computing device and a computing device used by the topic specialist.

20 Claims, 4 Drawing Sheets

(56) References Cited

U.S. PATENT DOCUMENTS

| | | | |
|---|---|---|---|
| 2011/0066498 A1* | 3/2011 | Wojcicki | G06Q 30/02 705/14.55 |
| 2011/0072132 A1 | 3/2011 | Shafer et al. | |
| 2011/0164610 A1 | 7/2011 | Cabasse et al. | |
| 2011/0179026 A1 | 7/2011 | Van Mulligen et al. | |
| 2012/0020473 A1 | 1/2012 | Mart et al. | |
| 2012/0278081 A1 | 11/2012 | Chun et al. | |
| 2012/0293678 A1 | 11/2012 | Amor et al. | |

OTHER PUBLICATIONS

U.S. Appl. No. 13/217,369, filed Aug. 25, 2011, Final Office Action dated Jul. 21, 2017.
U.S. Appl. No. 13/217,369, filed Aug. 25, 2011, Notice of Abandonment dated Feb. 1, 2018.
U.S. Appl. No. 13/208,589, filed Aug. 12, 2011, Notice of Allowance dated Feb. 6, 2013.
U.S. Appl. No. 13/208,589, filed Aug. 12, 2011, Response to Non-Final Office Action dated on Oct. 19, 2012.
U.S. Appl. No. 13/208,589, filed Aug. 12, 2011, Non-Final Office Action dated Oct. 19, 2012.
U.S. Appl. No. 13/217,364, filed Aug. 25, 2011, Response to Final Office Action dated Dec. 11, 2013.
U.S. Appl. No. 13/217,364, filed Aug. 25, 2011, Final Office Action dated Dec. 11, 2013.
U.S. Appl. No. 13/217,364, filed Aug. 25, 2011, Response to Non-Final Office Action dated May 21, 2013.
U.S. Appl. No. 13/217,364, filed Aug. 25, 2011, Non-Final Office Action dated May 21, 2013.
U.S. Appl. No. 14/331,673, filed Jul. 15, 2014, Response to Final Office Action dated Mar. 3, 2015.
U.S. Appl. No. 14/331,673, filed Jul. 15, 2014, Final Office Action dated Mar. 3, 2015.
U.S. Appl. No. 14/331,673, filed Jul. 15, 2014, Response to Non-Final Office Action dated Nov. 14, 2014.
U.S. Appl. No. 14/331,673, filed Jul. 15, 2014, Non-Final Office Action dated Nov. 14, 2014.
U.S. Appl. No. 14/807,506, filed Jul. 23, 2015, Response to Non-Final Office Action dated Aug. 28, 2015.
U.S. Appl. No. 14/807,506, filed Jul. 23, 2015, Non-Final Office Action dated Aug. 28, 2015.
U.S. Appl. No. 13/217,369, filed Aug. 25, 2011, Non-Final Office Action dated Jan. 20, 2017.
U.S. Appl. No. 13/217,369, filed Aug. 25, 2011, Patent Board of Appeals Decision mailed on Jun. 23, 2016.
U.S. Appl. No. 13/217,369, filed Aug. 25, 2011, Final Office Action dated Feb. 25, 2016.
U.S. Appl. No. 13/217,369, filed Aug. 25, 2011, Response to Non-Final Office Action dated Jul. 15, 2015.
U.S. Appl. No. 13/217,369, filed Aug. 25, 2011, Non-Final Office Action dated Jul. 15, 2015.
U.S. Appl. No. 13/217,369, filed Aug. 25, 2011, Response to Final Office Action dated Nov. 26, 2013.
U.S. Appl. No. 13/217,369, filed Aug. 25, 2011, Final Office Action dated Nov. 26, 2013.
U.S. Appl. No. 13/217,369, filed Aug. 25, 2011, Response to Non-Final Office Action dated Apr. 8, 2013.
U.S. Appl. No. 13/217,369, filed Aug. 25, 2011, Non-Final Office Action dated Apr. 8, 2013.
Response to FOA dated Aug. 25, 2011 for U.S. Appl. No. 13/217,369.

* cited by examiner

LOCATION BASED CALL ROUTING TO SUBJECT MATTER SPECIALIST

CROSS-REFERENCE TO RELATED APPLICATION

This application claims the benefit of and is a continuation of U.S. patent application Ser. No. 13/208,589, filed Aug. 12, 2011 and entitled "LOCATION BASED CALL ROUTING TO SUBJECT MATTER SPECIALIST," which is hereby incorporated herein by reference in its entirety.

BACKGROUND

Before computing devices became portable, customers sometimes obtained information about products at home, and then took that information with them when viewing, purchasing, or evaluating the product. Mobile computing devices allow customers to obtain product information when viewing or evaluating the product, when the information is more relevant. For example, a customer can search a manufacturer's web site or read product reviews while in the store. However, sometimes customers desire product information which is not readily found on the internet.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing assistance to customers, including mobile customers. More specifically, some embodiments of the present disclosure relate to using the current geographic location of a mobile customer to route a call from the mobile customer to a specialist who can provide product assistance. The mobile customer interacts with an application to request contact with a specialist. A mobile customer's current location, for example, within a particular department of a store, is obtained using technology such as a global positioning system (GPS) in a mobile computing device. The current location is mapped to a topic or product category, and the topic is mapped to a person with knowledge about that topic. Other embodiments of the present disclosure relate to using a product identifier to identify an appropriate product specialist.

Through the contact application on the computing device, a phone call is automatically established between the computing device and a computing device operated by the topic specialist. The topic specialist is then available to provide assistance to the customer while the customer is on site and able to interact with products.

Figure 1:
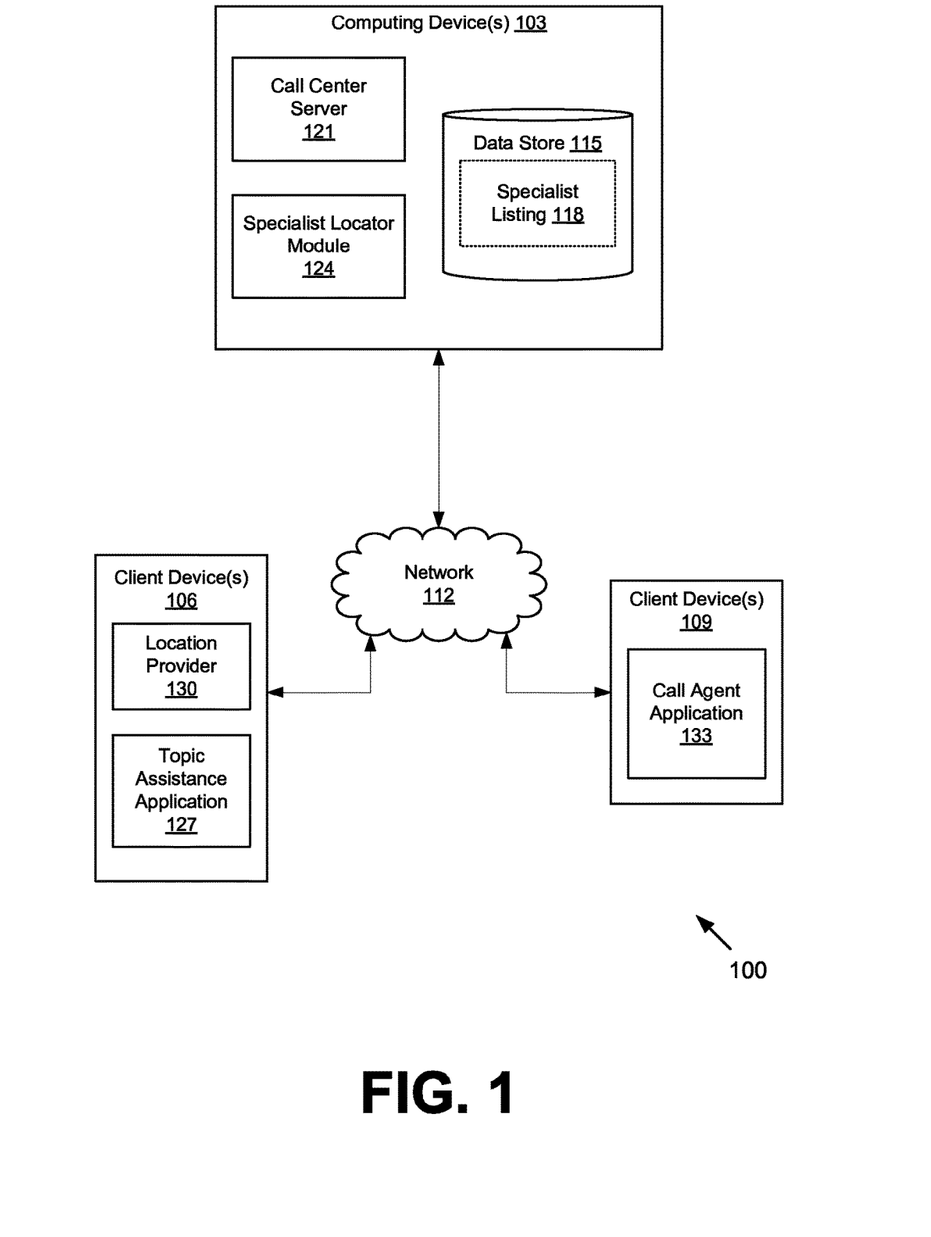
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 and one or more client devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below. The data stored in the data store 115 includes, for example, a specialist listing 118, as well as potentially other data. The specialist listing 118 contains information about persons who specialize in or have expertise in various subject matter or topic areas. Examples of specialist listing 118 include a phone number at which the person can be reached, a subject matter or topic area in which the person is knowledgeable, and educational or work experience qualifications of the subject matter specialist. The specialist listing 118 may be implemented as a database, and in such cases may be indexed by topic, by a geographic location which is associated with a topic, or by any other suitable field.

The components executed on the computing device 103, for example, include a call center server 121 and a specialist locator module 124. The specialist locator module 124 is executed to find a topic or subject matter specialist that is appropriate to aid a customer. In some embodiments, the appropriate topic specialist is determined based on that customer's current physical location. The location may correspond, for example, to a department within a store. In other embodiments, the appropriate topic specialist is determined based on an identifier of a product selected by a customer.

The specialist locator module 124 is also executed to determine a phone number at which the topic specialist can be reached. The call center server 121 is executed to route and connect calls from a client device 106, operated by a customer, to a client device 109 operated by a topic specialist. The topic specialist can thus be viewed as a call agent with respect to the call center server 121.

Calls between customers and topic specialists are carried on a data network such as the network 112. The call center server 121 may utilize features such as automatic call distribution and interactive voice response in the process of routing a call between a customer and a subject matter specialist. In some embodiments, the call center server 121 is implemented using a set of protocols referred to as Voice over Internet Protocol (VoIP). The VoIP protocols may include, but are not limited to, Session Initiation Protocol (SIP), Session Description Protocol (SDP), Real Time Transport Protocol (RTP), Real-time Transport Control Protocol (RTCP), IP Multimedia Subsystem (IMS), Media Gateway Control Protocol (MGCP), and International Telecommunication Union (ITU) H.323.

In various embodiments, the call center server 121 and the specialist locator module 124 may utilize any type of middleware framework to communicate with each other. Similarly, the call center server 121 and the specialist locator module 124 may utilize any type of middleware framework to communicate with application executing on a client device 106, such as the topic assistance application 127 or the location provider component 130. Examples of such frameworks include remote procedure calls, service-oriented architecture protocol (SOAP), representational state transfer (REST), Windows Communication Foundation, and other frameworks. Although described herein as separate components, the functionality of the call center server 121 and the specialist locator module 124 can also be combined, as should be appreciated. Although described herein as separate components, the functionality of the topic assistance application 127 or the location provider component 130 can also be combined, as should be appreciated.

The client device 106 or client device 109 is representative of a plurality of client devices that may be coupled to the network 112. The client device 106 or client device 109 may comprise, for example, a processor-based system such as a computer system. Such a computer system may be embodied in the form of a cellular telephone, a smart phone, a personal digital assistant, a portable navigation system, a set-top box, a music player, a video player, a media player, a web pad, a tablet computer system, a game console, a desktop computer, a laptop computer, or other devices with like capability. Some embodiments of the client device 106 or client device 109 may be mobile or portable devices.

The client device 106 may be configured to execute various applications such as a topic assistance application 127 and a location provider component 130. The client device 106 may be configured to execute other applications such as, for example, browsers, email applications, instant message applications, navigation applications, and/or other applications. The topic assistance application 127 may be executed in the client device 106 to facilitate a customer contacting a topic specialist in order to obtain assistance or more information about a particular topic. To this end, the topic assistance application 127 may interact with the call center server 121. The topic assistance application 127 may be implemented as a standalone application or may be executed in the context of a browser, as should be appreciated.

The location provider component 130 is executed in the client device 106 to provide the current location of the client device 106. Various technologies may be used to implement the location provider component 130, for example, a global positioning system (GPS), an assisted global positioning system (A-GPS), a wireless local area network (WiFi) positioning system, or a wireless network (WiMax) positioning system. The location provider component 130 may rely on specialized hardware residing in the client device 106, such as a GPS transceiver, a WiFi transceiver, and/or a WiMax transceiver, as should be appreciated. The location provider component 130 may also rely on other specialized hardware separate from the client device 106, such as a GPS satellite network, one or more WiFi access points, and/or one or more WiMax access points, as should be appreciated.

The client device 109 may be configured to execute various applications such as a call agent application 133 and/or other applications. The call agent application 133 may be executed in the client device 109 to answer phone calls that originate from customers. To this end, the call agent application 133 may interact with the call center server 121. During the call, the call agent application 133 may provide the topic specialist with information that identifies the topic of the call. The client device 109 may be configured to execute other applications such as, for example, browsers, email applications, instant message applications, navigation applications, and/or other applications.

Next, a general description of the operation of the various components of the networked environment 100 in an example use scenario is provided. To begin, a mobile customer uses the topic assistance application 127 to make a phone call in order to obtain assistance for a particular topic. The customer is not required to identify the topic. Instead, the topic of interest is derived from the mobile customer's current physical location. To this end, in response to a request for assistance from the mobile customer, the topic assistance application 127 obtains the mobile customer's current geographic location from the location provider component 130. The current geographic location is more specific than an area code, and in some embodiments may be more specific than a street address. In particular, the current geographic location may be accurate enough to place the customer within a structure or building such as a store, and may even be accurate enough to place the customer within a particular department or aisle within a store.

These geographic locations are each associated with a topic or subject matter area. As one example, a location corresponding to a store department is associated with the category of items or products offered in that department. As another example, a location corresponding to an aisle within a store is associated with the category or categories of items or products displayed on that aisle. Automatically deriving the item category from the customer's location reduces the amount of information which the customer must provide in order to obtain assistance on that item category.

As yet another example, if the location is a city neighborhood, the associated topic may be the neighborhood itself. By automatically deriving the topic from the customer's location, the topic assistance application 127 can facilitate the customer obtaining more information about the neighborhood by talking to a specialist, without even knowing the name of the neighborhood.

As yet another example, if the location is a particular city block, the associated topic may be businesses, stores, or points of interest located on that block. By automatically deriving the topic from the customer's location, the topic assistance application 127 can facilitate the customer obtaining more information from a specialist who is knowledgeable about those points of interest.

The topic assistance application 127 then sends a call request, which includes the customer's current location, to the call center server 121 executing on the computing device 103. The call center server 121 uses the services of the specialist locator module 124 to find a particular person who has knowledge about a topic, where the topic has a predefined association with the customer's geographic location. The topic specialist returned by the specialist locator module 124 may be at the same location as the customer, or may be located remotely with respect to the customer. If the customer location is a business, the topic specialist may be an employee of the business, or may be a third party provider. The call center server 121 then fulfills the customer's request for assistance by routing the phone call to the identified specialist. The topic may be an item such as a product or product category, so that the topic specialist can be viewed as an item specialist or product specialist.

In some embodiments, the specialist locator module 124 maps directly from the geographic location to the contact phone number for the topic specialist. In other embodiments, the specialist locator module 124 maps from the geographic location to the topic area, and from the topic area to a contact phone number for a specialist in that topic area. In still other embodiments, the specialist locator module 124 maps from the geographic location to the topic area and the call center server 121 maps the topic area to a specialist and a phone number for the specialist. In such embodiments, the mapping function is distributed between the specialist locator module 124 and the call center server 121.

Once the call between the mobile user and the topic specialist is established, the call proceeds in the conventional fashion. The phone call may include audio, video, multimedia, or a combination thereof. The video portion of the call may utilize a camera or other video capture device located in the mobile client device 106, or may utilize cameras or other video capture devices installed at the mobile customer's current location and connected to the network 112. For example, if the customer is in a store, network-accessible cameras may be installed along various aisles of the store, or in various store departments. If the customer is outside on a street, the call may use various network-accessible cameras on the street.

The call may include, or be associated with, data other than audio or video. For example, the topic specialist may send data to the mobile client device 106, for example in the form of a network page. In this manner, the topic specialist can provide information about a product during the call.

Figure 2:
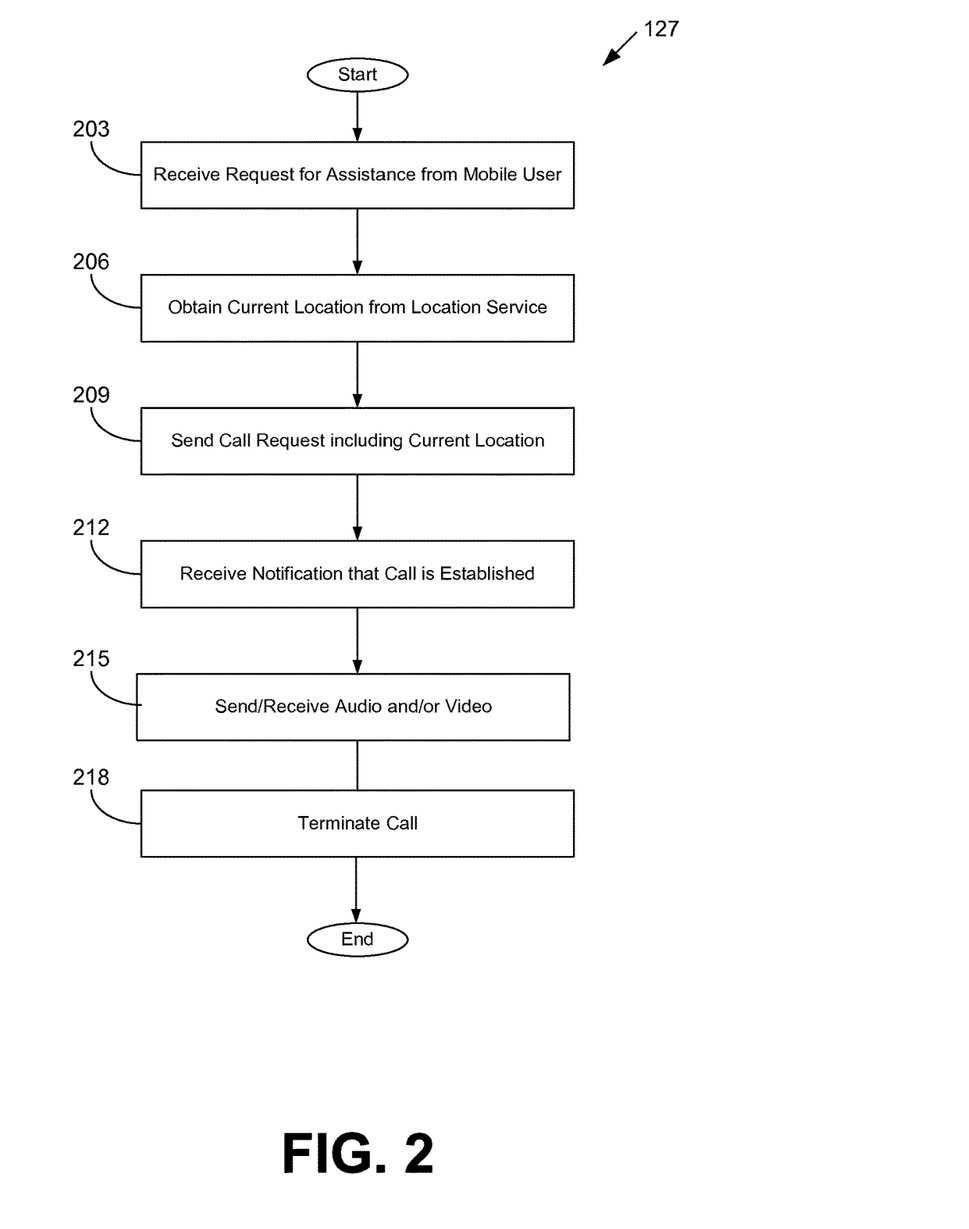
FIG. 2 is a flowchart illustrating one example of functionality implemented as portions of a topic assistance application executed in a computing device in the networked environment of FIG. 1 according to various embodiments of the present disclosure.

Turning now to FIG. 2, shown is a flowchart that provides one example of the operation of a portion of the topic assistance application 127 according to various embodiments. It is understood that the flowchart of FIG. 2 provides merely an example of the many different types of functional arrangements that may be employed to implement the operation of the portion of the topic assistance application 127 as described herein. As an alternative, the flowchart of FIG. 2 may be viewed as depicting an example of steps of a method implemented in the client device 106 (FIG. 1) according to one or more embodiments.

Beginning at box 203, the topic assistance application 127 receives, from a user of the client device 106, a request to contact a topic specialist. The contact request is not required to identify the topic, because the topic is instead derived from the current location of the mobile client device 106. To this end, at box 206 the topic assistance application 127 obtains, from the location provider component 130 executing on the client device 106, the current location of the client device 106. At box 209, the topic assistance application 127 sends a call initiation request to the call center server 121. The request includes the geographic location, but is not required to include the phone number of the callee. In some embodiments, the request also includes a topic identifier.

In response to the call initiation request, the call center server 121 routes the call to a topic specialist who can provide assistance to the user. At box 212, the topic assistance application 127 receives from the call center server 121 a notification that the call to the topic specialist has been established. The notification may include information such as the name, credentials, qualifications, and/or business affiliation of the specialist, Next, at box 215, the client device 106 handles the call by sending audio and/or video to the topic specialist, and by receiving audio and/or video from the topic specialist. Finally, at box 218 the call is terminated at the direction of either the customer or the topic specialist. The process of FIG. 2 is then complete.

In the embodiment described in connection with FIG. 2, an appropriate topic specialist is determined based on the customer's geographic location, for example, the current location of a mobile customer. In another embodiment, an application executing on a client device provides a product identifier to the topic assistance application 127, and the product identifier is mapped to a topic and then to a topic specialist. For example, the product bar code may be used as a product identifier. The bar code may be directly readable by the client device, or the customer may input the bar code manually. Other types of product identifiers may also be used, such as stock-keeping units (SKUs), serial numbers, etc.

Figure 3:
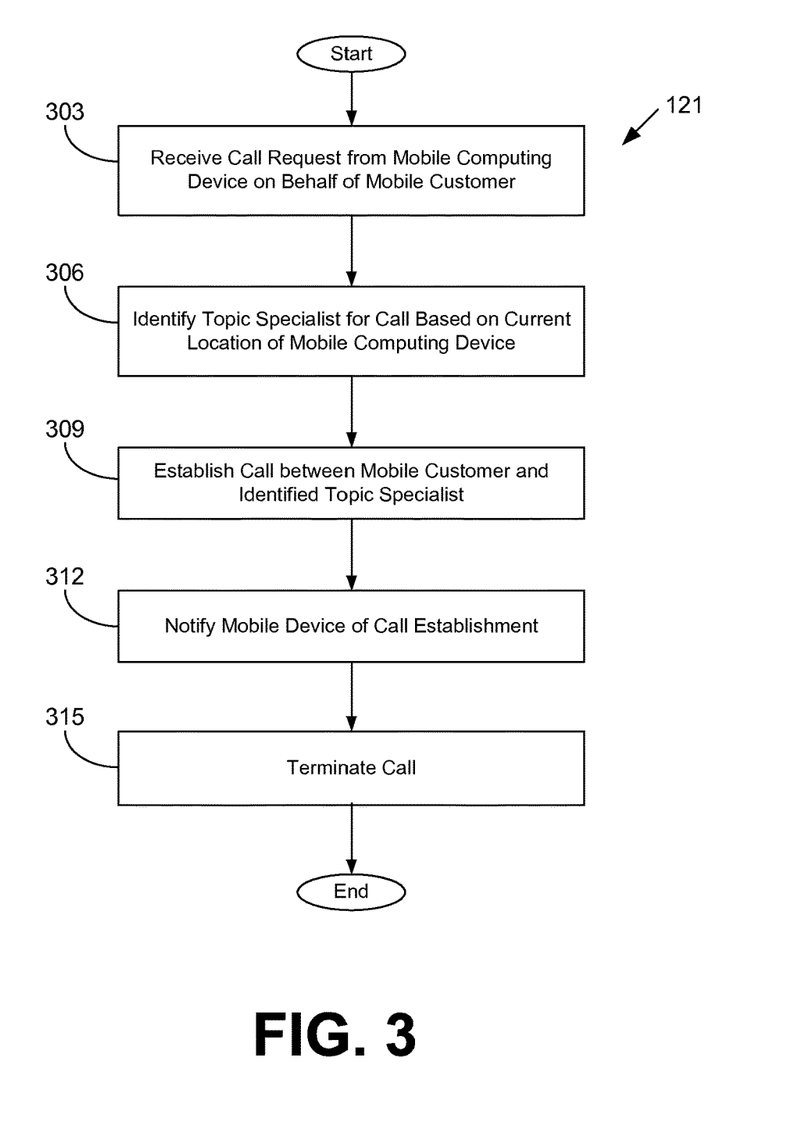
FIG. 3 is a flowchart illustrating another example of functionality implemented as portions of a call center server and/or a specialist locator module executed in a computing device in the networked environment of FIG. 1 according to various embodiments of the present disclosure.

With reference now to FIG. 3, shown is a flowchart that provides one example of the operation of a portion of the call center server 121 according to various embodiments. It is understood that the flowchart of FIG. 2 provides merely an example of the many different types of functional arrangements that may be employed to implement the operation of the portion of the call center server 121 as described herein. As an alternative, the flowchart of FIG. 2 may be viewed as depicting an example of steps of a method implemented in the computing device 103 (FIG. 1) according to one or more embodiments.

Beginning at box 303, the call center server 121 receives a call request from the topic assistance application 127 executing on a client device 106. The call request includes the current location of the client device 106. As discussed above, associations between geographic locations and topics, and/or between geographic locations and topic specialists, are stored in the specialist listing 118. At box 306, the call center server 121 uses the services of specialist locator module 124 to identify a topic specialist based on the mobile customer's geographic location. Next, at box 309, the call center server 121 routes the call from the client device 106 to the phone number of the identified topic specialist. At box 312, the call center server 121 notifies the topic assistance application 127 that the call has been established. At some later point in time, at box 315 the call is terminated at the direction of either the mobile customer or the topic specialist. The process of FIG. 3 is then complete.

In the embodiments described above, the mapping between the current geographic location of the client device 106 and the appropriate topic specialist for the phone call is performed by the call center server 121. In other embodiments, the client device 106 performs this mapping locally. In some of these embodiments, the client device 106 then establishes the phone call without the assistance of the call center server 121, using for example, a VoIP service to connect to the client device 109 and thus to communicate with the topic specialist.

Figure 4:
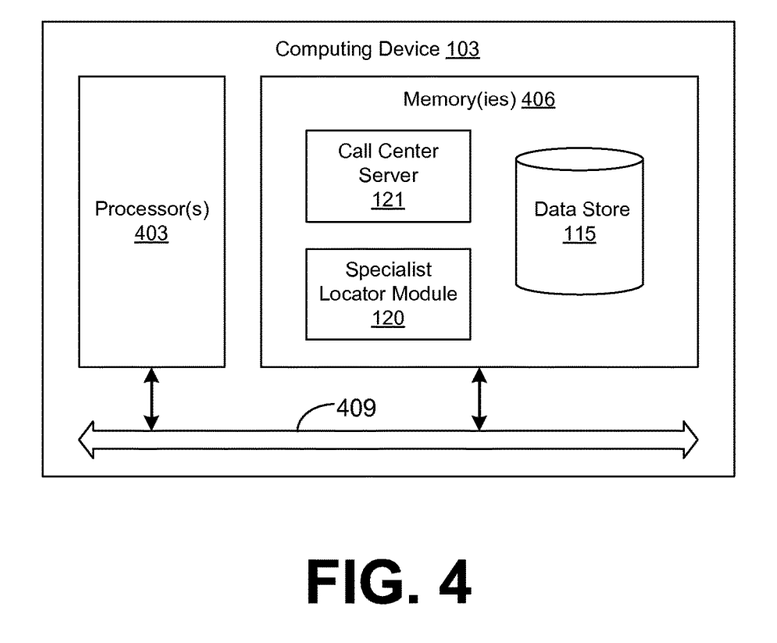
FIG. 4 is a schematic block diagram that provides one example illustration of a computing device employed in the networked environment of FIG. 1 according to various embodiments of the present disclosure.

Moving on to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the call center server 121, the specialist locator module 124, and potentially other applications. Also stored in the memory 406 may be a data store 115 and other data. In addition, an operating system may be stored in the memory 406 and executable by the processor 403. While not illustrated, the client device 106 and the client device 109 also include components like those shown in FIG. 4, where by the topic assistance application 127 and the call agent application 133 are stored in a memory and executable by a processor.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the location provider component 130, the call center server 121, the specialist locator module 124, topic assistance application 127, the call agent application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the call center server 121 and the specialist locator module 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIG. 2 or 3 may be executed concurrently or with partial concurrence. Further, in some embodiments, one or more of the blocks shown in FIG. 2 or 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including location provider component 130, the call center server 121, the specialist locator module 124, topic assistance application 127, and the call agent application 133, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a mobile computing device, the program, when executed, being configured to cause the mobile computing device to at least:
    obtain a product assistance request associated with a mobile user;
    obtain a current intra-building location of the mobile computing device, the current intra-building location being associated with at least one of a particular department of a plurality of departments or a particular aisle of a plurality of aisles;
    generate a request to initiate a voice call, the request including the current intra-building location of the mobile computing device and a product category;
    identify a product specialist associated with the current intra-building location of the mobile computing device based at least in part on the current intra-building location being associated with the at least one of the particular department or the particular aisle;
    obtain confirmation that the voice call has been established with a computing device associated with the product specialist;
    send audio from the mobile computing device to the computing device associated with the product specialist;
    obtain audio from the computing device associated with the product specialist, the audio from the computing device associated with the product specialist being associated with the product specialist; and
    terminate the voice call in response to a termination request.

2. The non-transitory computer readable medium of claim 1, the program further being configured to cause the at least one computing device to at least:
    send video signals from the mobile computing device to the computing device associated with the product specialist; and
    reproduce video signals from the computing device associated with the product specialist.

3. A computer-implemented method comprising:
    obtaining, by at least one computing device, a call request from a client device, the call request pertaining to a current intra-building location of the client device, wherein the current intra-building location is associated with at least one of a particular department or a particular aisle;
    identifying, by the at least one computing device, a topic associated with the current intra-building location of the client device based at least in part on the current intra-building location being associated with the at least one of the particular department or the particular aisle;
    identifying, by the at least one computing device, a topic specialist for the topic; and
    completing, by the at least one computing device, the call request by initiating a call between a computing device associated with the topic specialist and the client device.

4. The computer-implemented method of claim 3, further comprising obtaining a phone number for the computing device associated with the topic specialist based at least in part on the current intra-building location of the client device.

5. The computer-implemented method of claim 3, wherein the topic is at least one of: a product category, a service category, or a geographic location.

6. The computer-implemented method of claim 3, wherein the topic comprises a product category and the call request comprises an identifier associated with the product category.

7. The computer-implemented method of claim 3, wherein the call is selected from the group consisting of a voice call, a video call, or a multimedia call.

8. The computer-implemented method of claim 3, wherein the current intra-building location of the client device is derived from at least one of: a global positioning system capability of the client device, an assisted global positioning system capability of the client device, a wireless local area network positioning system capability of the client device, or a wireless network positioning system capability of the client device.

9. The computer-implemented method of claim 3, wherein the call comprises video captured by a camera associated with the at least one of the particular department or the particular aisle.

10. The computer-implemented method of claim 3, wherein the current intra-building location of the client device locates the client device within an area of a store in which products in a product category are displayed.

11. The computer-implemented method of claim 10, wherein identifying the topic associated with the current intra-building location of the client device comprises identifying the product category associated with the area of the store.

12. The computer-implemented method of claim 11, wherein identifying the topic specialist for the topic comprises identifying the topic specialist based at least in part upon the product category associated with the area of the store.

13. A system, comprising:
   at least one computing device; and
   a specialist locator application executable by the at least one computing device, the specialist locator application configured to cause the at least one computing device to at least:
      obtain a call request from a mobile computing device, the call request including a current location of the mobile computing device, wherein the current location is associated with at least one of a particular department or a particular aisle of a store;
      map the current location of the mobile computing device to an item specialist based at least in part on the current location being associated with the at least one of the particular department or the particular aisle of the store; and
      complete the call request by initiating a call between the mobile computing device and a computing device associated with the item specialist.

14. The system of claim 13, wherein the specialist locator application is further configured to identify a topic associated with the current location of the mobile computing device, wherein the current location of the mobile computing device is mapped to a topic based at least in part on the at least one of the particular department or the particular aisle of the store, and the topic is mapped to the item specialist.

15. The system of claim 14, wherein the topic is at least one of a product category or a service category.

16. The system of claim 15, wherein the call request further comprises an identifier corresponding to the at least one of the product category or the service category.

17. The system of claim 14, wherein the call request further comprises an identifier associated with a product identifier captured by the mobile computing device and the specialist locator application further comprises logic that identifies the item specialist based at least in part upon an analysis of the product identifier.

18. The system of claim 17, wherein the product identifier comprises a bar code identifying a product available within an area of a store.

19. The system of claim 13, wherein the call comprises video captured by a camera associated with the at least one of the particular department or the particular aisle.

20. The system of claim 13, wherein the current location of the mobile computing device is derived from at least one of: a global positioning system, an assisted global positioning system, a wireless local area network positioning system, or a wireless network positioning system.

* * * * *